United States Patent
Behrens

(10) Patent No.: US 7,775,577 B2
(45) Date of Patent: Aug. 17, 2010

(54) VEHICLE SEAT ARRANGEMENT

(75) Inventor: Meinhard Behrens, Obernkirchen (DE)

(73) Assignee: Faurecia Autositze GmbH, Stadthagen (DE)

( * ) Notice: Subject to any disclaimer, the term of this patent is extended or adjusted under 35 U.S.C. 154(b) by 223 days.

(21) Appl. No.: 11/877,126

(22) Filed: Oct. 23, 2007

(65) Prior Publication Data

US 2008/0106131 A1  May 8, 2008

(30) Foreign Application Priority Data

Oct. 25, 2006  (DE) .................... 10 2006 051 099

(51) Int. Cl.
*B60N 2/01* (2006.01)
(52) U.S. Cl. ...................................... 296/64
(58) Field of Classification Search .................. 296/64, 296/65.01, 66, 65.16, 69; 297/232
See application file for complete search history.

(56) References Cited

U.S. PATENT DOCUMENTS

| | | | |
|---|---|---|---|
| 2,502,061 A * | 3/1950 | Radford | 296/66 |
| 5,611,589 A | 3/1997 | Fujii et al. | |
| 5,704,685 A | 1/1998 | Handa et al. | |
| 6,631,946 B1 | 10/2003 | Neale | |
| 7,240,950 B2 | 7/2007 | Fourrey et al. | |
| 7,527,315 B2 * | 5/2009 | Sumida et al. | 296/69 |
| 2004/0160080 A1 * | 8/2004 | Shibata et al. | 296/64 |

FOREIGN PATENT DOCUMENTS

| | | |
|---|---|---|
| DE | 3102845 | 8/1982 |
| DE | 19548400 | 7/1996 |
| DE | 19821396 | 3/1999 |
| DE | 10212548 | 10/2003 |
| DE | 102004027009 | 5/2004 |
| DE | 10252155 | 5/2005 |
| DE | 102004032247 | 1/2006 |
| DE | 102005052893 | 5/2006 |
| EP | 1470950 | 10/2004 |
| GB | 2372438 | 8/2002 |
| JP | 2000342378 | 5/2002 |

OTHER PUBLICATIONS

Translation of DE 10212548 Oct. 2, 2003.*

* cited by examiner

*Primary Examiner*—H Gutman
(74) *Attorney, Agent, or Firm*—Kenyon & Kenyon LLP

(57) ABSTRACT

A vehicle seat arrangement, e.g., for a motor vehicle, includes a base seat part and a folding seat part, with the base seat part including a vehicle seat and a side part, and with the folding seat part and the side part forming a further vehicle seat or a part of a further vehicle seat.

23 Claims, 5 Drawing Sheets

VEHICLE SEAT ARRANGEMENT

CROSS-REFERENCE TO RELATED APPLICATIONS

The present application claims priority to Application No. 10 2006 051 099.2 filed in the Federal Republic of Germany on Oct. 25, 2006, which is expressly incorporated herein in its entirety by reference thereto.

FIELD OF THE INVENTION

The present invention relates to a vehicle seat arrangement, e.g., for a motor vehicle, having a base seat part and a folding seat part.

BACKGROUND INFORMATION

German Published Patent Application No. 10 2004 027 009 describes a seat bench for motor vehicles having at least one seat part and at least one backrest and side cheeks arranged to the side of the seat part and/or of the backrest, the alignment of which side cheeks relative to the seat part or to the backrest is adjustable, with the alignment of the side cheeks being adjustable as a function of the number of seating places of the seat bank are occupied or are to be occupied, such that at least a part of the side cheeks is set upright relative to the seat part and/or to the backrest for the case of at least two vehicle seats being occupied, or is lowered for the case of at least three vehicle seats being occupied.

European Published Patent Application No. 1 470 950 describes a seat arrangement in a micro-compact vehicle, which seat arrangement has at least one single-seat front seat bench and at least one two-seat rear seat bench, with the front seat bench and the rear seat bench including in each case at least one base body seat part and at least one base body backrest part and a further seat arrangement which has at least one single-seat front seat bench and at least one two-seat rear seat bench, with the two-seat rear seat bench having at least two individual seats which are arranged transversely with respect to a direction of travel.

German Published Patent Application No. 31 02 845 describes an emergency seat arrangement for a vehicle having a rigid backrest which is articulatedly connected with one of its ends in the region of the vehicle base so as to be pivotable between an inactive position in which its planar back face forms a constituent part of the vehicle base, and an upright operating position. The emergency seat arrangement includes a seat which, when the backrest is situated in its inactive position, is situated, so as to be covered by the backrest, in a receiving space below the plane of the vehicle base, with a web of flexible, tear-resistant material serving to form the seat and a support for the backrest, the one end of which web is fastened to the upper end of the backrest in the operating position, and the other end of which web is fastened, in order to form the front edge of the seat, to a transversely extending bracket which is mounted on the vehicle so as to be pivotable between an inactive position, in which it is sunk into the receiving space, and a substantially upright operating position, while lateral tensioning hooks engage on the throat region of the web between the seat and the backrest.

U.S. Pat. No. 6,631,946 describes a seat arrangement for motor vehicles having a seat cushion which can be stored in the vehicle base and having a backrest which can be folded up to the vehicle roof.

Further folding mechanisms in the context of vehicle seats are described, for example, in German Published Patent Application No. 102 12 548, German Published Patent Application No. 195 48 400, Japanese Published Patent Application No. 2000-342378, German Published Patent Application No. 10 2004 032 247, German Published Patent Application No. 31 02 845, German Published Patent Application No. 10 2005 052 893, German Published Patent Application No. 102 52 155, in U.S. Pat. No. 5,611,589, German Published Patent Application No. 198 21 396 and British Published Patent Application No. 2 372 438.

SUMMARY

Example embodiments of the present invention provide for an improved vehicle seat.

According to example embodiments of the present invention, a vehicle seat arrangement, e.g., for a motor vehicle, includes a base part and a folding seat part, with the base seat part including a vehicle seat and a, e.g., cushioned, side part, and with the folding seat part and the, e.g., cushioned, side part forming a further vehicle seat or a part of a further vehicle seat or a seat face of a further vehicle seat or a part thereof. The side part is, e.g., in traverse direction, may be sloped downwardly toward the folding seat part (as, e.g., illustrated in FIG. 6). The side part may include a region which is, e.g., in traverse direction, sloped downwardly toward the folding seat part (as, e.g., illustrated in FIG. 6), wherein the folding seat part and the region being, e.g., in traverse direction, sloped downwardly toward the folding seat part form a seat face of a further vehicle seat or a part thereof.

According to example embodiments of the present invention, a vehicle seat arrangement, e.g., for a motor vehicle, includes a first base seat part, a second base seat part and a folding seat part which is arranged between the first base seat part and the second base seat part, with the first base seat part including a first vehicle seat and a, e.g., cushioned, first side part, with the second base seat part including a second vehicle seat and a, e.g., cushioned, second side part, and with the folding seat part, the, e.g., cushioned, first side part and the, e.g., cushioned, second side part forming a third vehicle seat or a part of a third vehicle seat or a seat face of a third vehicle seat or a part thereof. The first and second side part may each, e.g., in traverse direction, be sloped downwardly toward the folding seat part (as, e.g., illustrated in FIG. 6). The first and second side part may each include a region which is, e.g., in traverse direction, sloped downwardly toward the folding seat part (as, e.g., illustrated in FIG. 6), wherein the folding seat part and the regions being, e.g., in traverse direction, sloped downwardly toward the folding seat part form a seat face of a further vehicle seat.

A folding seat part may include, e.g., no complete vehicle seat. A folding seat part may be narrower than a conventional vehicle seat. A folding seat part may be no wider than, e.g., 350 mm. A folding seat part may be narrower than the base seat part or both narrower than the first base seat part and also narrower than the second base seat part.

The folding seat part, in a folded-open state, may include a seat face having a tensioned cover. The contour of the seat face (at least in a significant region of the tensioned cover) may be determined by the tension of the tensioned cover. The contour of the seat face (at least in a significant region of the tensioned cover) may be not determined by a support cushioning. No support cushioning may be provided beneath the tensioned cover (at least in a significant region of the tensioned cover). The cover may be tensioned between the backrest and a beam. A tensioned cover may include a conventional seat cover but is not restricted thereto. A tensioned cover may include fabric, textile, leather, artificial leather, etc.

The side part may be, e.g., in traverse direction, sloped downwardly toward the tensioned cover (as, e.g., illustrated in FIG. 6). The side part may include a region which is, e.g., in traverse direction, sloped downwardly toward the tensioned cover (as, e.g., illustrated in FIG. 6), wherein the tensioned cover and the region being, e.g., in traverse direction, sloped downwardly toward the tensioned cover form a seat face of a further vehicle seat or a part thereof.

The folding seat part may include a, e.g., cushioned, backrest, and the backrest may include a back panel which extends substantially over the entire backrest. A back panel may be a metal sheet or panel for maintaining a survival space in a motor vehicle and/or for occupant protection. A back panel may extend substantially over the entire backrest, e.g., when the back panel extends substantially over the entire backrest in two orthogonal directions. A back panel may extend substantially over the entire backrest, e.g., when the back panel extends substantially over the entire backrest in the transverse direction of the motor vehicle and in the vertical direction. A back panel may extend substantially over the entire backrest, e.g., when the back panel extends substantially over the entire backrest in its longitudinal direction and in the vertical direction.

The side part may include a region being, e.g., in traverse direction, sloped backwardly toward the backrest (as, e.g., illustrated in FIG. 2).

The backrest, in a folded-together state of the folding seat part, may form a walk-on tread surface. The folding seat part, in the folded-open state, may include a cavity beneath the tensioned cover, and/or the tensioned cover may at least partially delimit and/or form a cavity.

The cover may include a substantially non-expandable support layer. A support layer may, for example, include a material for safety belts. The cover may include a cushioning layer which is arranged on the support layer, and/or the cover may include a decorative layer which is arranged on the cushioning layer. A decorative layer may include a conventional seat cover.

The folding seat part may include an unlocking device in a front region. The folding seat part may include a cushioning on a front and/or rear seat frame beam.

The height of the folding vehicle seat in the folded-together state may be, e.g., no more than 100 mm, e.g., no more than 70 mm.

According to example embodiments of the present invention, a motor vehicle includes a vehicle seat arrangement, e.g., including one or more of the above-mentioned features. At least one rear bench or a further vehicle seat may be arranged behind the vehicle seat arrangement, with the folding seat part, in a folded-together state, forming an access to the rear bench or to the further vehicle seat. A vehicle seat for a driver and/or a vehicle seat for a co-driver may be arranged in front of the vehicle seat arrangement. The folding seat part may be arranged on a drive tunnel.

It should be understood that a in traverse direction (with respect to a seat face) is, e.g., an orientation in a plane parallel to the seat face, wherein the orientation is orthogonal to a longitudinal direction. A traverse direction (with respect to a backrest) is, e.g., an orientation in a plane parallel to the backrest, wherein the orientation is orthogonal to a vertical direction. A slope may include a slope of, e.g., at least 10°. Sloped should be understood as a slope having, e.g., if being curved, a radius of curvature of not less than, e.g., 10 cm. Sloped should be understood as not being curved away from the folding seat part or its tensioned cover or backrest. A sloped region may be distinguished from a curved region typically located at the edge of a seat face.

A motor vehicle is, e.g., a land vehicle which can be used individually on the road. Motor vehicles are, however, not restricted to land vehicles with internal combustion engines.

Further features and aspects of example embodiments of the present invention are described in more detail below with reference to the appended Figures.

DETAILED DESCRIPTION

Figure 1:
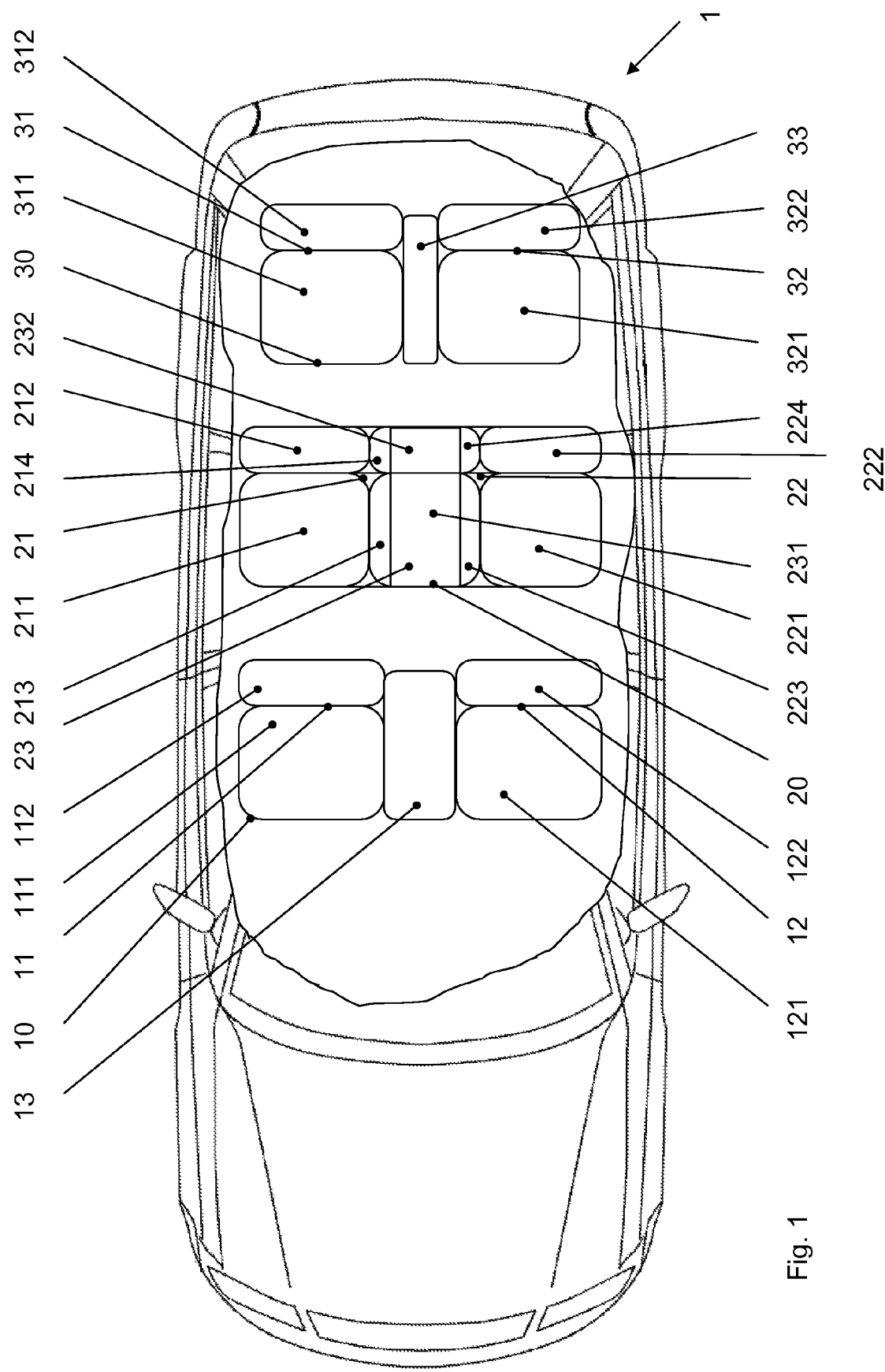
FIG. 1 schematically illustrates a motor vehicle.

FIG. 1 is a schematic top view of a motor vehicle 1. The motor vehicle 1 includes a front vehicle seat arrangement 10 having a vehicle seat 11, a console 13 and a vehicle seat 12, a central vehicle seat arrangement 20 and a rear vehicle seat arrangement 30 having a vehicle seat 31, a console 33 and a vehicle seat 32. The vehicle seat arrangement 20 includes a base seat part 21, a base seat part 22 and a folding seat part 23 which is arranged between the base seat part 21 and the base seat part 22 and which, e.g., is arranged on a drive tunnel 50, illustrated, e.g., in FIG. 2.

Reference numerals 111, 121, 311 and 321 denote seat faces of the vehicle seats 11, 12, 31 and 32, respectively, and reference numerals 112, 122, 312 and 322 denote backrests of the vehicle seats 11, 12, 31 and 32, respectively. Reference numerals 211 and 221 denote seat faces of the base seat parts 21 and 22, and reference numerals 212 and 222 denote backrests of the base seat parts 21 and 22. The seat face 211 and the backrest 212 form a vehicle seat. In addition, the seat face 221 and the backrest 222 also form a vehicle seat. The base seat parts 21 and 22 additionally include cushioned seat-face-side side parts 213 and 223 and also cushioned backrest-side side parts 214 and 224.

The folding seat part 23 includes a seat face 231 and a backrest 232. In the folded-open state of the folding seat part 23, the seat face 231 and the backrest 232, e.g., as illustrated in FIG. 2 and a detailed cross-sectional illustration of the vehicle seat arrangement 20 in FIG. 6, form a vehicle seat together with the cushioned seat-face-side side parts 213 and 223 and the cushioned backrest-side side parts 214 and 224.

Side part 213 includes a region, in traverse direction, sloped downwardly toward folding seat part 23 or seat face 231 respectively, Side part 223 includes a region, in traverse direction, sloped downwardly toward folding seat part 23 or seat face 231 respectively 3, and folding seat part 23 or seat face 231 respectively form a seat face of a vehicle seat. The side part 214 includes a region, in traverse direction, sloped backwardly, the side part 224 includes a region, in traverse direction, sloped backwardly, and backrest 232 form a backrest of that vehicle seat. In traverse direction should be understood as an orientation which is represented by double headed arrow 100.

Figure 2:
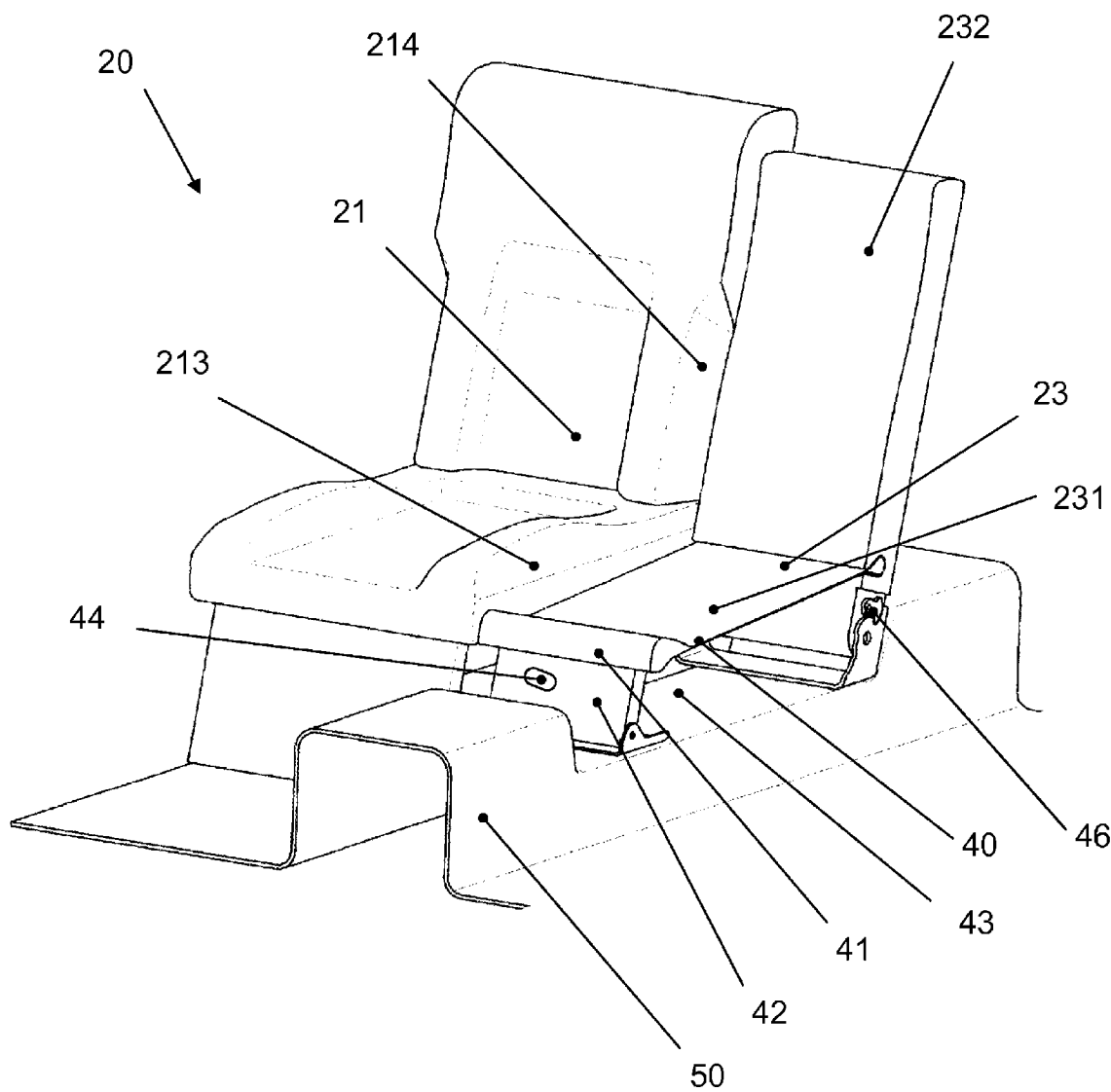
FIG. 2 is a schematic perspective view of a vehicle seat arrangement having a folding seat part in a folded-open state.
Figure 3:
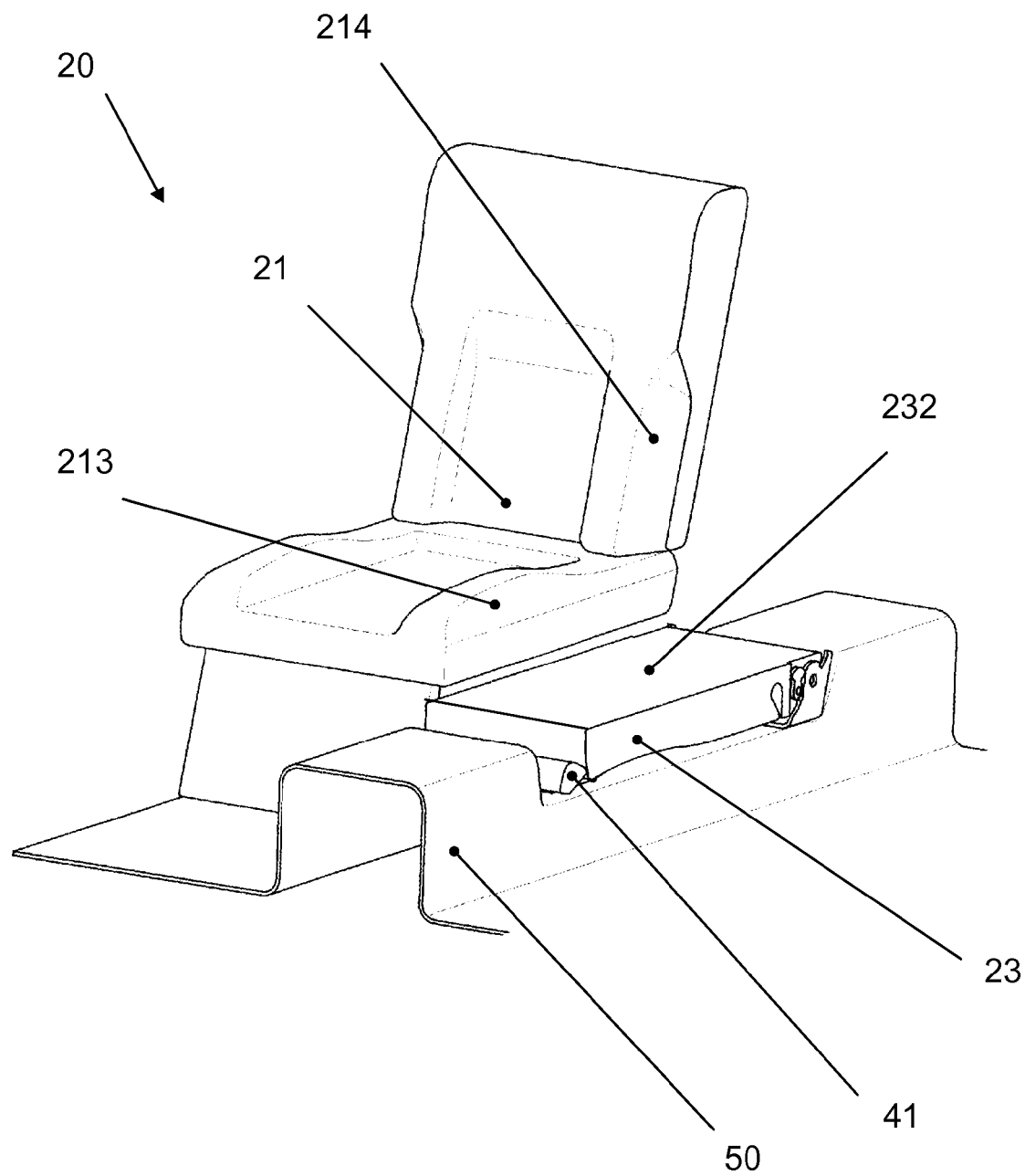
FIG. 3 is a schematic perspective view of the vehicle seat arrangement illustrated in FIG. 2 in a folded-together state of the folding seat part.
Figure 4:
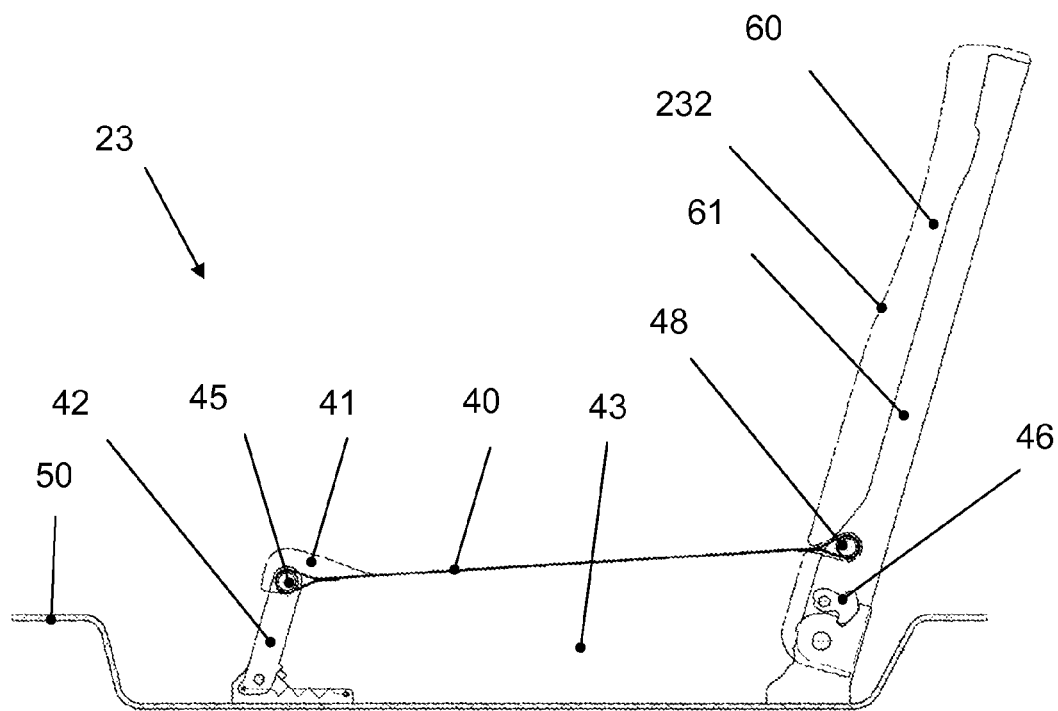
FIG. 4 is a schematic side view of the vehicle seat arrangement illustrated in FIG. 2 in a folded-open state of the folding seat part.
Figure 5:
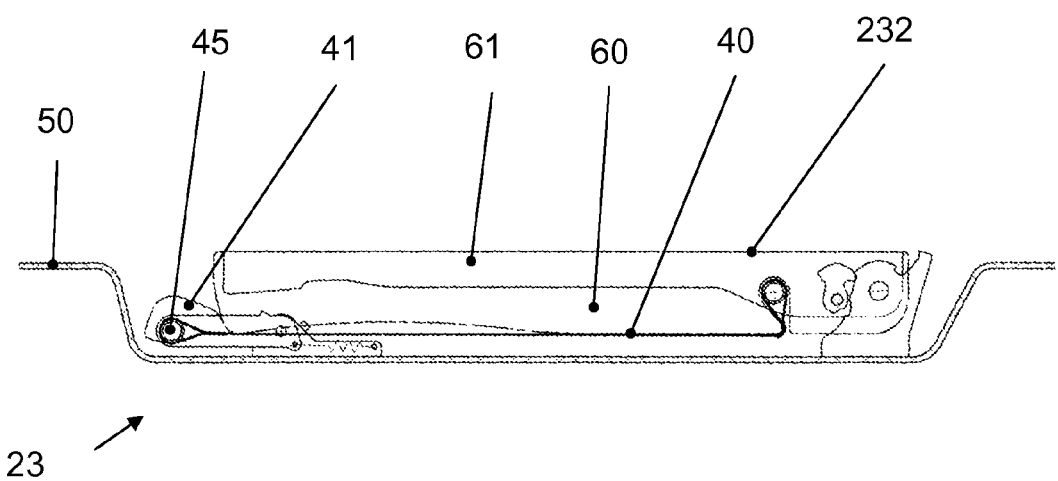
FIG. 5 is a schematic side view of the vehicle seat arrangement illustrated in FIG. 2 in a folded-together state of the folding seat part.
Figure 6:
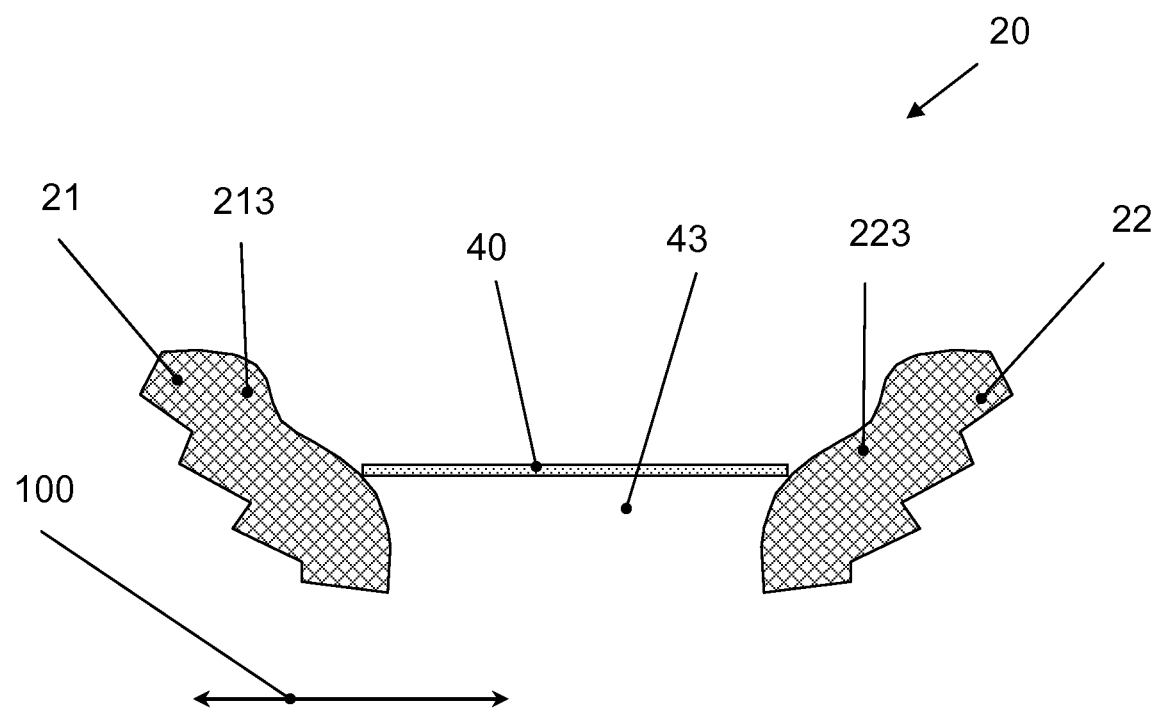
FIG. 6 is a schematic cross-sectional view through the vehicle seat arrangement illustrated in FIG. 2.

FIG. 2 is a schematic perspective view of an exemplary embodiment of a vehicle seat arrangement 20 having a folding seat part 23 in a folded-open state, FIG. 3 is a schematic perspective view of the part of the vehicle seat arrangement 20 illustrated in FIG. 2 in a folded-together state of the folding seat part 23, FIG. 4 is a schematic side view of the seat part 23 in a folded-open state, FIG. 5 is a schematic side view of folding seat part 23 in a folded-together state, and FIG. 6 is a cross-sectional view through the vehicle seat arrangement 20 in a folded-together state of the folding seat part 23. In the folded-open state of the folding seat part 23, the seat face 231 or a significant part of the seat face 231 is formed by a cover 40 which is tensioned between a support plate 42 or a front seat frame beam 45 and the backrest 232 or a rear seat frame beam 48, which cover 40 is not supported by any support cushioning. The folding seat part 23 includes, in the folded-open state, a cavity 43 beneath the tensioned cover 40, so that the contour of the seat face 231 (at least in a significant region of the tensioned cover 40) is determined by the tension of the tensioned cover 40 and not by a support cushioning placed beneath.

The backrest 232 includes a back panel 61 which extends substantially over the entire backrest 232. The back panel 61 is cushioned by a support cushioning 60. The backrest 232 may include further components, such as a frame and/or a front-side and/or rear-side decorative cover.

The folding seat part 23 may include a cushioning 41 on the front seat frame beam 45. The folding seat part 23 may include an unlocking device 44 in a front region, by which unlocking device 44, a locking device 46 of the folding seat part 23 may be unlocked, so that the folding seat part 23, as illustrated in FIG. 3 and FIG. 5, can be folded together after being unlocked. The height of the folding vehicle seat in the folded-together state may be, e.g., no more than 100 mm, e.g., no more than 70 mm. In the folded-together state of the folding seat part 23, the backrest 232 or the back panel 61 forms a walk-on tread surface which permits access to the rear vehicle seat arrangement 30.

Figure 7:
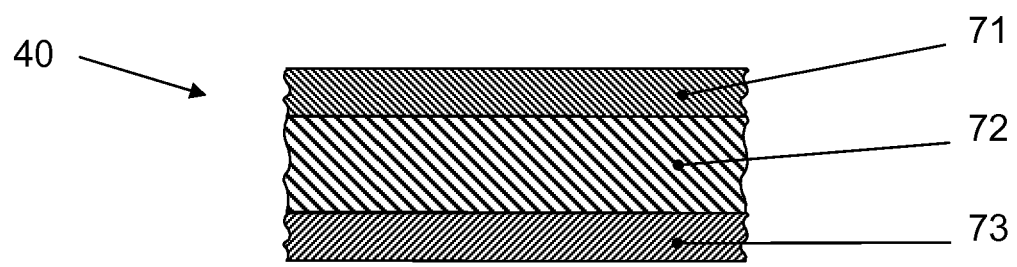
FIG. 7 is a schematic cross-sectional view of a tensioned cover.

FIG. 7 is a schematic cross-sectional view of an exemplary embodiment of the cover 40. The cover 40 includes a substantially non-expandable support layer 73. A support layer may, e.g., be composed of a material for safety belts. The tensioned cover 40 may additionally include a cushioning layer 72 which is arranged on the support layer 73 and a decorative layer 71 which is arranged on the cushioning layer 72.

The components are illustrated in the figures taking simplicity and clarity into consideration, and not necessarily to scale. For example, the orders of magnitude of some components are illustrated in an exaggerated fashion in relation to other components in order to improve understanding.

LIST OF REFERENCE NUMERALS

1 Motor vehicle
10, 20, 30 Vehicle seat arrangement
11, 12, 21, 22
31, 32 Vehicle seats
13, 33 Console
23 Folding seat part
40 Tensioned cover
41 Cushioning
42 Support plate
43 Cavity
44 Unlocking device
45, 48 Seat frame beam
46 Locking device
50 Drive tunnel
60 Seat cushioning
61 Back panel
71 Decorative layer
72 Cushioning layer
73 Support layer
100 Double headed arrow
111, 121, 211,
221, 231, 311,
321 Seat face
112, 122, 212,
222, 232, 312,
322 Backrest
213, 214,
223, 224 Side part

What is claimed is:

1. A vehicle seat arrangement for a motor vehicle, comprising:
    a base seat part including a vehicle seat having a backrest and a seat bottom, the base seat part further including a side part extending along a side of the seat bottom; and
    a folding seat part;
    wherein the folding seat part and the side part form at least one of (a) a seat face of a further vehicle seat and (b) a part of the seat face; and
    wherein the side part is, in a transverse direction, sloped downwardly toward the folding seat part.

2. The vehicle seat arrangement according to claim 1, wherein the side part includes a region that is, in the transverse direction, sloped downwardly toward the folding seat part.

3. The vehicle seat arrangement according to claim 1, wherein the folding seat part, in a folded-open state, includes a tensioned cover, and the side part is, in the transverse direction, sloped downwardly toward the tensioned cover, the tensioned cover forming, together with the side part, at least one of (a) the seat face of the further vehicle seat and (b) the part of the seat face.

4. The vehicle seat arrangement according to claim 1, wherein the folding seat part, in a folded-open state, includes a seat face formed of a tensioned cover, and the side part includes a region, in the transverse direction, sloped downwardly toward the tensioned cover.

5. The vehicle seat arrangement according to claim 4, wherein the folding seat part includes a cushioned backrest.

6. The vehicle seat arrangement according to claim 5, wherein the base seat part includes a second side part adjacent the backrest of the base seat part and including a region, in the transverse direction, sloped backwardly toward the backrest of the folding seat part.

7. The vehicle seat arrangement according to claim 5, wherein the backrest of the folding seat part, in a folded-together state of the folding seat part, forms a walk-on tread surface.

8. The vehicle seat arrangement according to claim 7, wherein the base seat part includes a second side part extending along a side of the backrest of the base seat part and including a region, in a folded-open state of the folding seat part, that is, in the transverse direction, sloped backwardly toward the walk-on tread surface.

9. A vehicle seat arrangement for a motor vehicle, comprising:
    a first base seat part including a first vehicle seat having a first backrest and a first seat bottom, the first base seat part further including a first side part extending along a side of the first seat bottom;

a second base seat part including a second vehicle seat having a second backrest and a second seat bottom, the second base seat part further including a second side part extending along a side of the second seat bottom; and a folding seat part arranged between the first base seat part and the second base seat part;

wherein the folding seat part, the first side part and the second side part form a seat face of a third vehicle seat; and wherein each of the first side part and the second side part is, in a transverse direction, sloped downwardly toward the folding seat part.

10. The vehicle seat arrangement according to claim 9, wherein each of the first side part and the second side part includes a region, in the transverse direction, sloped downwardly toward the folding seat part.

11. The vehicle seat arrangement according to claim 9, wherein the folding seat part, in a folded-open state, includes a tensioned cover, each of the first side part and the second side part, in the transverse direction, sloped downwardly toward the tensioned cover, the tensioned cover, together with the first and second side parts, forming the seat face of the third vehicle seat.

12. The vehicle seat arrangement according to claim 9, wherein the folding seat part, in a folded-open state, includes a seat face formed of a tensioned cover, each of the first side part and the second side part including a region, in the transverse direction, sloped downwardly toward the tensioned cover.

13. The vehicle seat arrangement according to claim 12, wherein the folding seat part includes a cushioned backrest.

14. The vehicle seat arrangement according to claim 13, wherein the first base seat part includes a first upper side part adjacent the first backrest and the second base seat part includes a second upper side part adjacent the second backrest, wherein each of the first upper side part and the second upper side part includes a region, in the transverse direction, sloped backwardly toward the backrest.

15. The vehicle seat arrangement according to claim 13, wherein the backrest of the folding seat part, in a folded-together state of the folding seat part, forms a walk-on tread surface.

16. The vehicle seat arrangement according to claim 15, wherein the first base seat part includes a first upper side part adjacent the first backrest and the second base seat part includes a second upper side part adjacent the second backrest, wherein each of the first upper side part and the second upper side part includes a region, in a folded-open state of the folding seat part, that is, in the transverse direction, sloped backwardly toward the walk-on tread surface.

17. A motor vehicle, comprising:

a front vehicle seat arrangement;

a rear vehicle seat arrangement arranged behind the front vehicle seat arrangement; and a middle vehicle seat arrangement arranged between the front vehicle seat arrangement and the rear vehicle seat arrangement, the middle vehicle seat arrangement including:

a base seat part including a vehicle seat having a backrest and a seat bottom, the base seat part further including a side part extending along a side of the first seat bottom; and a folding seat part;

wherein the folding seat part and the side part form at least one of (a) a seat face of a further vehicle seat and (b) a part of the seat face;

wherein the folding seat part, in a folded-together state, forms an access to the rear vehicle seat arrangement; and wherein the side part includes a region, in a transverse direction, sloped downwardly toward the folding seat part.

18. The motor vehicle according to claim 17, wherein the folding seat part, in a folded-open state, includes a seat face formed of a tensioned cover, the side part including a region, in the transverse direction, sloped downwardly toward the tensioned cover.

19. The motor vehicle according to claim 18, wherein the folding seat part includes a cushioned backrest.

20. The motor vehicle according to claim 19, wherein the base seat part includes a second side part extending along a side of the backrest of the base seat part and including a region, in the transverse direction, sloped backwardly toward the backrest.

21. The motor vehicle according to claim 19, wherein the backrest of the folding seat part, in a folded-together state of the folding seat part, forms a walk-on tread surface.

22. The motor vehicle according to claim 17, wherein the folding seat part is arranged on a drive tunnel.

23. The motor vehicle according to claim 17, wherein the middle vehicle seat arrangement includes a further base seat part including a further vehicle seat and a further side part, the folding seat part arranged between the base seat part and the further base seat part, the folding seat part, the side part and the further side part forming a seat face of a vehicle seat.

* * * * *